United States Patent [19]

DePue et al.

[11] Patent Number: 5,603,865
[45] Date of Patent: Feb. 18, 1997

[54] COPOLYMER DISPERSANT COMPOSITION FOR INORGANIC PIGMENTS

[75] Inventors: Jeffrey S. DePue, Canton; Zenon P. Czornij, Warren; Clint G. Carpenter, Royal Oak; Lynne G. Bemer, Northville, all of Mich.

[73] Assignee: BASF Corporation, Southfield, Mich.

[21] Appl. No.: 516,511

[22] Filed: Aug. 17, 1995

Related U.S. Application Data

[63] Continuation of Ser. No. 982,355, Nov. 27, 1992, abandoned.

[51] Int. Cl.[6] .............. B01J 13/00; C09K 1/62; C04B 14/00; C09C 1/34
[52] U.S. Cl. .............. 252/313.1; 252/302; 252/363.5; 106/400; 106/404; 106/453
[58] Field of Search .............. 252/363.5, 313.1, 252/302; 524/403, 406, 407, 413; 106/400, 404, 453

[56] References Cited

U.S. PATENT DOCUMENTS

| | | | |
|---|---|---|---|
| 3,175,991 | 3/1965 | Levine | 252/512 |
| 3,507,821 | 4/1970 | Vasta | 524/509 |
| 3,515,579 | 6/1970 | Shepherd et al. | 428/436 |
| 4,423,172 | 12/1983 | Otsuki et al. | 523/454 |
| 4,791,168 | 12/1988 | Salatin et al. | 524/601 |
| 4,794,147 | 12/1988 | Savino et al. | 525/440 |
| 4,942,185 | 7/1990 | Inoue et al. | 521/54 |
| 5,002,996 | 3/1991 | Okuda et al. | 524/436 |
| 5,057,360 | 10/1991 | Osaka et al. | 428/220 |
| 5,093,391 | 3/1992 | Barsotti et al. | 523/400 |

FOREIGN PATENT DOCUMENTS

0462557A2  6/1991  European Pat. Off. ........ C09D 17/00

OTHER PUBLICATIONS

Arnott et al, Cationic–Film–Forming Inhibitors for the Protection of the AA 7075 Aluminum Alloy Against Corrosion in Aqueous Chloride Solution, Jan. 1989 pp. 12–18.

Primary Examiner—Sharon Gibson
Assistant Examiner—Joseph D. Anthony
Attorney, Agent, or Firm—Anne Gerry Sabourin

[57] ABSTRACT

The present invention is directed to a pigment dispersant composition for use with inorganic pigments in coating compositions. The dispersant composition includes a vinyl or acrylic copolymer and a transition metal or rare earth metal salt. The metal salt in combination with the copolymer is useful with inorganic pigment as it lowers the viscosity of the pigment dispersions, thus allowing a higher concentration of pigment in the dispersion and consequently providing dispersions with higher non-volatile content and higher pigment to binder ratios. The presence of the metal salts in the dispersant composition when used with surface coated metal flake pigment provides excellent corrosion reduction of the metal pigment, indicated by the reduction or elimination of hydrogen gassing by the pigment in a coating composition.

17 Claims, No Drawings

COPOLYMER DISPERSANT COMPOSITION FOR INORGANIC PIGMENTS

This application is a continuation of Ser. No. 07/982,355, filed Nov. 27, 1992, now abandoned.

FIELD OF THE INVENTION

The present invention is directed to a metal salt containing, copolymer pigment dispersant composition for inorganic pigment in aqueous coating compositions.

BACKGROUND OF THE INVENTION

Aqueous coating compositions comprise a principal resin, and may contain a crosslinker, pigments dispersed in a grind resin and other additives such as solvents, control agents, fillers and the like.

Pigments are typically dispersed in a coating composition by means of a pigment paste. Pigment pastes are usually prepared by dispersing a pigment in a grinding resin in the presence of plasticizers, wetting agents, surfactants or other ingredients in a ball mill, sand mill or continuous mill, until the pigment has been reduced to the desired particle size and is wetted by the resin or dispersed in it. Such methods require lengthy processing times and yield dispersions having relatively poor color development and stability, compared to solvent-based paints.

Dispersing agents for dispersing pigments and dyes in organic liquids are disclosed in U.S. Pat. No. 4,937,014, to Canestri, issued Jun. 26, 1990. This composition contains an amino acid that has first been reacted with a metal salt and then is reacted with a carboxylic acid terminated polyester.

The present invention is directed to a pigment dispersant composition for inorganic pigment usable in an aqueous coating composition. The invention provides dispersions containing a salt of a transition metal or rare earth metal. The dispersant compositions are highly effective for dispersing inorganic pigment and demonstrate unexpected results by decreasing the viscosity of the dispersant composition containing the inorganic pigment. As a result of the decreased viscosity a higher concentration of pigments can be used in the dispersion, resulting in a higer pigment to binder ratio. Due to increased solids content, the volatile content of the pigment dispersion is decreased.

When the dispersant composition of the present invention is used with surface coated metal flake pigments, particularly with aluminum flake pigments, exceptional results are obtained for decreased corrosion of the pigment in an aqueous coating composition. This is significant because the water-borne coating compositions in use today have a basic pH. The pH of acrylic coating compositions typically ranges from 8.0–9.0, and the polyurethane coating compositions typically have a pH ranging from 7.5 to 8.0.

Exposure of metal flake pigments to a basic pH aqueous environment, results in the formation of metal hydroxide ions, which are soluble in water. The production of metal hydroxide ions results in the solubilization of the metal pigment and the exposure of more pigment surface area to the corrosive environment. The formation of metal hydroxide occurs relatively rapidly with metal flake pigments due to the high surface to mass ratio of the small particles. The reaction is a form of corrosion and converts the pigment to a hydrated oxide form unsuitable for pigment use, as it destroys the metallic pigmentation properties of the mirror-like particles. Corrosion is exacerbated since the reaction of the metal in water results in the continuous formation of $H^+$ ions, evidenced by the production of hydrogen gas, and $OH^-$ ions. The $H^+$ ions attack and corrode the metal pigment particles and the $OH^-$ ions cause the pH of the environment to further increase. The high pH of water-borne coating systems speeds up the reaction that produces the hydrated metal oxide and results in serious degradation or corrosion of metallic flake pigment used in metallic coatings. Contact with the environment is continuous over extended periods of time, since coatings containing the pigment are often stored for 6 months or more before application.

It has been found that the transition metal and rare earth metal salts inhibit corrosion of the metal flake pigment particles, particularly aluminum flake pigment particles, in the basic pH aqueous coating environment. This is due to a compact film of transition metal or rare earth metal oxides and hydroxides that replace the natural oxide film on the surface of the metal flake pigment. It is hypothesized that the transition metal or rare earth metal oxide/hydroxide film forms at local cathodic sites on the surface, where the alkaline conditions generated by oxygen reduction reactions cause the metal oxide to dissolve and the transition metal and/or rare earth metal oxide to precipitate.

The present invention is also directed to an aqueous coating composition containing the pigment dispersant compositions and an article coated with the coating composition.

SUMMARY OF THE INVENTION

The present invention is a polymeric dispersant composition for inorganic pigments. The dispersant includes a vinyl or acrylic copolymer functionalized with isocyanate, anhydride or epoxy functionalities. The copolymer may also include polyalkylene glycol homopolymer or copolymer functionality, to impart water-miscible character to the polymeric backbone. The copolymer may also include a polar functional compound, to further enhance dispersibility of the pigment. The copolymer is admixed water and with a salt of a transition metal, rare earth metal or mixture thereof to form a dispersant composition.

The copolymer is the reaction product of (i) an ethylenically unsaturated monomer having a reactive functionality from which grafting may take place, where said functionality is an isocyanate functionality, an anhydride functionality or an epoxy functionality; and (ii) at least one ethylenically unsaturated monomer having no functional group that reacts with the reactive functionality of monomer (i). The copolymer may also include an additional monomer (v) such as an ethylenically functional aromatic compound.

The copolymer is reacted with a polyalkylene glycol (iii) compound which is a polyalkylene glycol homopolymer, copolymer, or mixture thereof. The polyalkylene glycol reacts with the reactive functionality of monomer (i) to impart water miscible character to the polymer. Useful polyalkylene glycol compounds include polyalkylene glycol monoalkyl ethers and mixtures thereof.

When the reactive functionality of monomer (i) is an isocyanate functionality or an anhydride, the polyalkylene glycol compound reacts with the isocyanate or anhydride reactive functionality to form a sidechain. When the reactive functionality of monomer (i) is an epoxy functionality, the polyalkylene glycol compound must first be reacted with anhydride to form an acid functional polyalkylene glycol compound.

In one embodiment the copolymer also includes a polar functional compound to further enhance dispersibility of the pigment. The polar functional compound is selected from the group consisting of alkyl, aryl, and alkylaryl alcohols, acrylic and methacrylic acid, acetoacetate, silane-containing compounds, phosphorus-containing compounds and urea-containing compounds and mixtures thereof.

The compound with the polar functionality may be incorporated into the dispersant composition through reaction of an ethylenically unsaturated compound containing the polar functionality. This can occur by reaction of the polar functional compound with monomer (i) before polymerization or by copolymerizing one or more ethylenically unsaturated monomers containing the polar functionality or functionalities, with the ethylenically unsaturated monomers (i) and (ii) or (i), (ii) and (v).

Alternatively, a compound containing a polar functionality may be added after the polymerization reaction. This is done by functionalizing the polymeric backbone to contain isocyanate, hydroxy, epoxy or anhydride functionality and then grafting the various polar groups onto the functionality. These reactions are explained in greater detail in the Detailed Description.

If any isocyanate functionality provided by monomer (i) remains after the polymerization reaction and where applicable, after reacting the polyalkylene glycol compounds and polar functional compounds, the isocyanate may be capped by the addition of a compound having an amine or hydroxy functionality that reacts with the isocyanate. These amine and hydroxy containing compounds are selected from the group consisting of mono or dialkyl amines, mono or dicycloalkyl amines, aromatic amines, aryl aliphatic amines, mono and di alkanolamines, cyclic alkanolamines and primary and secondary ether alcohols.

The copolymer is combined with a salt of a transition metal, rare earth metal or mixtures thereof to form the dispersant composition. The inorganic pigments are preferably dispersed in an aqueous dispersant composition, to form a pigment grind paste. The pigment pastes are mixed with such ingredients as polymers, crosslinkers, and additional solvents (including additional water) to form an aqueous coating composition.

The addition of the transition metal and/or rare earth metal salt to the copolymer has a synergistic effect with the copolymer on grinding pigments. Inclusion of the salt results in a significant decrease in the viscosity of the dispersant composition and allows an increase in the concentration of pigments in the composition. This results in increased pigment to binder ratio and increased non-volatile content. The salts are also useful for decreasing the corrosion of metallic flake pigments, particularly chromated aluminum flake pigments, in the aqueous coating compositions. Useful salts include metal organic acid salts, halide salts, and nitrates of the transition metals and rare earth metals and mixtures thereof.

Another aspect of the present invention provides for a composition having a polymeric network containing a residue of the dispersant composition described herein above. Such a polymeric network is formed through the reactions of species having more than one reactive group, such as polymers and crosslinkers well-known to the art, and the compound, when the compound contains a group reactive with at least one of the species, said group forming a covalent bond to become part of the polymeric network. That part of the polymeric network originally contained in the compound is termed a residue of the compound. A polymeric network is formed, for example, during the curing of a coating composition. Preferably, the composition also contains at least one inorganic pigment that had been dispersed by the compound.

In addition to the effect of the dispersant composition on pigment grind pastes, coating compositions containing surface treated metal flake pigments dispersed in the pigment dispersion compositions of the present invention are highly reflective and have excellent appearance. As discussed above, the dispersion compositions reduce or elimate corrosion, as evidenced by hydrogen gassing in the coatings containing the metal flake pigments.

Yet another aspect of the present invention provides for a coated article. The coated article is a substrate with a coating thereon. The coating on the substrate contains the composition of the invention or a polymeric network containing a residue of the composition, along with at least one inorganic pigment.

DETAILED DESCRIPTION OF THE INVENTION

The pigment dispersant composition of the present invention includes a vinyl or acrylic copolymer having water miscible character and one or more metal salts of transition metals or rare earth metals.

The copolymer is preferably the reaction product of (i) an ethylenically unsaturated monomer having a reactive functionality from which grafting may take place, where said functionality is an isocyanate functionality, an anhydride functionality or an epoxy functionality; and (ii) at least one ethylenically unsaturated monomer having no functional group that reacts with the reactive functionality of monomer (i). The copolymer may also include an additional monomer (v) which is an ethylenically functional aromatic compound.

The ethylenically unsaturated monomer (i) is present in an amount between about 5% to about 50% by weight, preferably from about 20% to about 40% by weight based on total monomer weight. Suitable ethylenically unsaturated monomers containing an isocyanate functionality include dimethyl-meta-isopropenylbenzyl isocyanate, vinylisocyanate, isocyanatoethyl acrylate and isocyanato ethyl methacrylate, isopropenyl isocyanate, and mixtures thereof. Preferred is dimethyl-meta-isopropenylbenzyl isocyanate, also referred to as TMI®, available from American Cyanamid Co. Wayne, N.J. 076470.

Suitable ethylenically unsaturated monomers containing an anhydride functionality include olefinic and cycloolefinic anhydrides and substituted olefinic and cycloolefinic anhydrides, provided that the substituents do not adversely affect the reactivity of the anhydride or the properties of the resultant polymer. Examples of these substituents include chloro, alkyl and alkoxy substituents.

Examples of specific anhydrides include dodecenyl succinic anhydride, octadecenylsuccinic anhydride, tetrahydrophthalic anhydride, methyltetrahydrophthalic anhydride, endomethylene tetrahydrophthalic anhydride, chlorendic anhydride, itaconic anhydride, citraconic anhydride, nadic methyl anhydride and maleic anhydride.

Preferred monomers containing the anhydride functionality are itaconic anhydride and maleic anhydride.

Suitable ethylenically unsaturated monomers containing an epoxy functionality include glycidyl acrylate, glycidyl methacrylate, and allyl glycidyl ether. The preferred monomer containing the epoxy functionality is glycidyl methacrylate.

The ethylenically unsaturated monomers (ii), are present in an amount from about 10% to about 90% by weight, preferably from about 40% to about 70% by weight based on total monomer weight. Suitable monomers having no functionality that reacts with the reactive functionality of monomer (i), include acrylic and methacrylic alkyl, aryl, aryl alkyl and alkoxyalkyl esters. The alkyl esters of acrylic and methacrylic acid are derived from alcohols having from 1 to about 20 carbon atoms, from phenols or from vinyl monomers.

Preferred are the esters of acrylic and methacrylic acid such as methyl, ethyl, propyl, n-butyl, isobutyl, tert-butyl, cyclohexyl, and 2-ethylhexyl acrylates and methacrylates and mixtures thereof.

Also suitable are vinyl chloride, acrylamide and methacrylamide, acrylonitrile, methacrylonitrile, N-alkyl maleimides, N-aryl malemides and acrolein. Maleic acid and fumaric acid dialkyl esters in which the alkyl groups have 1 to 20 carbon atoms may also be used.

The ethylenically functional aromatic substituted monomer (v), when included, is present in an amount from about 5% to about 40% by weight, preferably from about 10% to about 20% by weight, based on total monomer weight.

Suitable monomers include styrene, alpha-methyl styrene, para-hydroxy styrene, tert-butyl styrene and vinyl toluene and halogenated vinyl benzenes such as chlorostyrene. Also useful are acrylic and methacrylic esters such as para-tolyl acrylate, benzyl acrylate, phenyl ethyl acrylate, naphthyl acrylate, benzyl methacrylate, phenyl methacrylate, naphthyl methacrylate, 3-phenylpropyl methacrylate, phenoxyethyl methacrylate. Additional useful monomers are aromatic-containing acrylamides and methacrylamides such as N-phenylacrylamide and mixtures of acrylamides. The preferred ethylenically unsaturated aromatic substituted monomers are styrene and phenyl methacrylate.

All weight percentages for the monomers (i), (ii) and (v) reflect a variance of ±5%.

In a preferred embodiment, the copolymer includes a polyalkylene glycol functionality to impart water miscible character to the polymer. This functionality is incorporated by 1) reacting at least one polyalkylene glycol compound that is a polyalkylene glycol homopolymer, copolymer, or mixture thereof with monomers, before the vinyl or acrylic copolymer is formed or 2) by grafting the polyalkylene glycol homopolymer, copolymer, or mixture thereof on to the copolymer.

The polyalkylene glycol compound is present in an amount between about 20% and about 60% by weight, preferably between about 30% and about 40% by weight, based on total non-volatile content of the dispersant composition. The weight percentages reflect a variance of ±5%.

Useful compounds for this purpose are polyalkylene glycol monoalkyl ethers and mixtures thereof. Examples of these include polyalkylene glycol monoalkyl ethers formed from monoalcohol initiated polymerization of ethylene oxide, propylene oxide and mixtures thereof with up to 30% by weight propylene oxide. Starting monoalcohols are $C_1$–$C_{18}$ alcohols such as methanol, ethanol, n-propanol, iso-propanol, hexanol, decanol, undecanol and ether alcohols such as methoxyethanol, butoxyethanol and the like. The preferred monoalkyl ethers are polyethylene glycol monoalkyl ethers, and polyethylene glycol monoalkyl ethers in mixture with other polyalkylene glycol monoalkyl ethers.

As described above, the polyalkylene glycol compound can be incorporated into the polymeric backbone by reaction with monomers, before the vinyl or acrylic copolymer is formed. This is accomplished by reacting the polyalkylene glycol with the reactive functionality on monomer (i) to form a side chain on the monomer before the addition polymerization reaction between monomers (i), (ii) and (v). When the reactive functionality of monomer (i) is an isocyanate or an anhydride, the polyalkylene glycol compound reacts with the isocyanate or anhydride reactive functionality.

When the polyalkylene glycol is incorporated after the copolymerization reaction, the polyalkylene glycol reacts with the isocyanate or anhydride functionality on the copolymer to form a sidechain.

With either method of introducing the polyalkylene glycol functionality, when the reactive functionality of monomer (i) is an epoxy functionality, the polyalkylene glycol must first be reacted with an anhydride to form an acid functional polyalkylene glycol. The preferred anhydride for this purpose is phthalic anhydride. The acid functional polyalkylene glycol can then be reacted with the epoxy functional monomer before the polymerization reaction. Alternatively, the acid functional polyalkylene glycol can be reacted with the epoxy functional copolymer, after the polymerization reaction.

In one embodiment, a compound having a polar functionality is included in the copolymer to further enhance pigment dispersibility. The polar functional group is selected from the group consisting of carboxylic acid, tertiary amine, acetoacetate, silane-containing compounds, phosphorus-containing compounds and urea-containing compounds and mixtures thereof.

Silane-containing compounds can be incorporated into the addition polymerization reaction in the form of a silane functional ethylenically unsaturated monomer. Alternatively, the silane-containing compound can be incorporated by reacting it with isocyanate, epoxy or anhydride functionality on the copolymer backbone.

When reacted with the functionalized copolymer having isocyanate groups, the silane-containing compounds contain isocyanate-reactive groups that react with the isocyanate groups on the copolymer. The isocyanate-reactive groups are selected from hydroxyl, amino, mercapto, or oxirane functional groups. Examples of such materials useful for forming the substituents compatible with the above-mentioned requirements are 3-aminopropyltrimethoxysilane, 3-aminopropyltriethoxysilane, 3-(N-methylamino) propyltrimethoxysilane, 3-mercaptopropyltrimethoxysilane, and (3-glycidoxypropyl) methyldiethoxysilane and the like. Preferred are amino-functional silanes, especially 3-aminopropyltrimethoxysilane, 3-aminopropyltriethoxysilane, and 3-(N-methylamino) propyltrimethoxysilane. The silane functional compounds useful in the present invention are disclosed in U.S. Pat. No. 5,156,677 to Carpenter et al. Silane materials that may be utilized in making the compounds of the invention are commercially available from, for example, Hüls America, Inc., Piscattaway, N.J.; or from Dow Corning Corp., Midland, Mich.; or from Union Carbide Corp., Danbury, Conn.

For reacting with the anhydride functional copolymer, the silane-containing compounds contain reactive groups that react with the anhydride groups on the copolymer. The anhydride-reactive groups are selected from hydroxyl, primary or secondary amine and mercapto functional groups.

For reacting with the epoxy functional copolymer, the silane-containing compounds contain reactive groups that react with the epoxy groups on the copolymer. The epoxy-reactive groups include amino, phenol or isocyanate functional groups.

Phosphorus-containing polar functional compounds are incorporated into the isocyanate functional copolymer by reacting the copolymer with a material containing a hydroxyl group and at least one other group capable of reacting with isocyanate or latent isocyanate functionalities on the functionalized copolymer, and subsequently reacting with phosphate containing compounds.

The material containing the hydroxyl group and at least one other group capable of reacting with isocyanate or latent isocyanate functionalities is a straight or branched compound of one to twelve carbon Atoms. The group capable of reacting with the isocyanate or latent isocyanate functionalities may be hydroxyl, amino, or mercapto. Representative examples of useful materials are diols, triols, and higher functionality polyols, such as ethylene glycol, propylene glycol, butylene glycol, neopentyl glycol, trimethylolethane, trimethylolpropane, 1,6-hexanediol, and pentaerythritol; mercaptoalcohols, such as mercaptoethanol, mercaptopropanol, mercaptobutanol, mercaptophenol, or 3-mercapto-1,2-propanediol; and amino alcohols, such as diethanolamine, methylethanolamine, and 6-amino-1-hexanol. Preferably, an amino group or hydroxyl group is chosen to react with the isocyanate. Amino alcohols are particularly useful.

The amino alcohol is first reacted with the isocyanate functional groups on the functionalized copolymer. The amino group is more reactive to isocyanate than the hydroxyl group. The difference in reactivity is exploited to minimize any crosslinking between functionalized copolymers. The reaction between amino and isocyanate groups may be accomplished under mild conditions, such as by stirring the two together for five minutes at room temperature.

The remaining alcohol group may be converted to the desired phosphate through various reaction schemes, such as reaction with polyphosphoric acid, phosphoric acid, phosphorous acid, or phosphorous pentoxide, or analogs that have phosphorous atoms monosubstituted with an alkyl of one to ten carbon atoms, an alkoxy of one to ten carbon atoms, an arylalkoxy of two to ten carbon atoms, an alkanoyloxy of two to ten carbon atoms, or a halogen. One preferred method is by addition of polyphosphoric acid at temperatures between about 25° C. and about 200° C. Other well known methods, using materials such as phosphorus pentachloride or phosphorus oxychloride, are available.

Phosphorus-containing polar functional compounds are incorporated into the epoxy functionalized copolymer by reacting the copolymer with polyphosphoric acid, phosphoric acid, phosphorous acid, or phosphorous pentoxide, or analogs that have phosphorous atoms monosubstituted with an alkyl of one to ten carbon atoms, an alkoxy of one to ten carbon atoms, an arylalkoxy of two to ten carbon atoms, an alkanoyloxy of two to ten carbon atoms, or a halogen. The phosphorus containing acid or analog reacts with the epoxy group on the copolymer to form a phosphate ester. The phosphate and silane compounds may be utilized separately or in combination.

The urea containing compound may be utilized with other silane or phosphorus-containing compounds or may be utilized alone as the polar functional compound. Particularly preferred for purposes of the present invention are the urea-containing compounds having the formula:

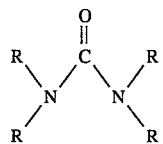

and mixtures thereof, wherein each R is independently selected from the group consisting of H, saturated and unsaturated aliphatic and alicyclic compounds that may be substituted or unsubstituted, substituted and unsubstituted aromatic compounds and divalent radicals such as, but not limited to —NH—, oxygen and sulfur, and wherein one R group has a functional group which can react with the reactive functionality on monomer (i). The R group having the reactive functional group is selected from the group consisting of monovalent alkyl radicals substituted with hydroxy and amino substituents, and ethylenically unsaturated groups substituted with amino, amide, carbonyl, carboxyl, epoxy, hydroxy, ether, ketone, aldehyde and ester functionalities and mixtures thereof. Such urea containing compounds are disclosed in EP 0 462 557 A2.

In a preferred embodiment, the R groups of the urea-containing compound are individually selected from the group consisting of H, alkyl and alkylene, and R'OH where R' is an alkylene group having from 1 to 4 carbon atoms and another R is a bond in this alkylene or is another alkylene radical. Preferred urea-containing compounds are omega hydroxy alkyl alkylene ureas and omega amino alkyl alkylene ureas. Such compounds include aminoethyl ethylene urea and 1-(2-hydroxyethyl)-2-imidazolidinone, also known as 2-hydroxyethyl ethylene urea.

The method for adding the urea-containing compound to the reaction mixture is determined by the functional group of R. If the functional group of R is polymerizable across an ethylenically unsaturated double bond, the urea-containing compound may be copolymerized with monomers (i) and (ii) or (i), (ii) and (v) as described hereinafter. If the functional group on R is not polymerizable, the urea-containing compound may be incorporated by grafting onto the functionalized copolymer after the polymerization of monomers (i) and (ii) or (i), (ii) and (v). The grafting reaction is accomplished by reaction of the urea-containing compound with the functional group on the copolymer.

In the event that the copolymer is epoxy functional, if the functional group of R is amino it can be reacted directly with the epoxy. If the functional group of R is OH, the urea-containing compound must first be reacted with anhydride to form an acid functional urea-containing compound. As described above, the polyalkylene glycol compound must also be acid functional to react with these epoxy functional monomers or polymers. For grafting the urea-containing compound and the polyalkylene glycol compound onto an epoxy functional copolymer, the preferred method of the present invention is to form both the acid functional urea and the acid functional polyalkylene glycol in one reaction. This is accomplished by combining the polyalkylene glycol, urea and anhydride, which makes both the polyalkylene glycol and urea acid functional. This mixture is then combined with the epoxy functional monomer and copolymerized with monomer (ii), or monomers (ii) and (iii). Alternatively, the epoxy functional copolymer is formed first and the acid functional polyalkylene glycol and urea are grafted on to the copolymer.

The polar-functional compounds are useful with any of the monomers defined as monomer (i). The preferred polar functional compounds are the silane-containing, phosphorus-containing and urea-containing compounds and mixtures thereof. The polar functional compound(s) is present in an amount between about 1.0 and about 7.0 percent by weight, preferably between about 3.0 and about 5.0 percent by weight, based on total non volatile content of the dispersant composition. Weight percentages for all polar compounds reflect a variance of ±0.5 percent.

The copolymer is formed by copolymerization using conventional techniques such as heating the monomers in the presence of a polymerization initiating agent and optionally chain transfer agents. The copolymerization may be carried out in bulk or solution. For the present invention it is preferred to form the copolymer by means of a free radical solution polymerization reaction. Solvents for solution polymerization should not have functional groups capable of reacting with the reactive functionalities on monomer (i).

Suitable solvents include ketones, such as methyl ethyl ketone, methyl propyl ketone and acetone; esters, such as butyl acetate and pentyl propionate; ethers, such as diethylene glycol dimethyl ether, dioxane, tetrahydrofuran; N-methyl pyrrolidone, ketoesters, aromatic hydrocarbons, alkanes, cyclic alkanes and mixtures thereof.

Typically initiators are peroxides such as dialkyl peroxides, peroxyesters, peroxydicarbonates, diacyl peroxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octyl mercaptan, n- or tert- dodecyl mercaptan; halogenated compounds; thiosalicylic acid, mercaptoacetic acid, mercaptoethanol, buten-1-ol and dimeric alpha-methyl styrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomers and initiator(s) are added at a controlled rate over a period of time, usually between 2 and 6 hours. A chain transfer agent or additional solvent may also be fed in at a controlled rate during this time. The temperature of the mixture is then maintained for a period of time to complete the reaction. Optionally, additional initiator may be added to ensure complete conversion.

The NCO number of a copolymer formed from monomer (i) containing an isocyanate reactive functionality and monomer (ii) is from about 0.3 meq/g NV to 2.0 meq/g NV, preferably from about 0.9 meq/g NV to about 1.4 meq/g NV. The copolymer has a weight average molecular weight determined by GPC versus polystyrene standards of from about 3,000 to about 25,000, preferably from about 4,000 to about 10,000.

As described above, the polyalkylene glycol compound may be added before or after the polymerization of monomers (i) and (ii) or (i), (ii) and (v). If the compound is added before the polymerization reaction, it is combined with monomer (i) and reacts with the reactive functionality on monomer (i), to form a sidechain. Monomer (i) is then polymerized with monomers (ii) and, (ii) and (v). This is usually done by an addition polymerization reaction.

The polyalkylene glycol compound also may be added after the polymerization of monomers has occurred. In this case the polyalkylene glycol compound reacts with the reactive functionality on the copolymer to form a sidechain on the copolymer.

If any unreacted isocyanate functionality remains after polymerization, or where applicable after grafting of the polyalkylene glycol and polar functional compounds onto the copolymer, the unreacted isocyanate may be capped by the addition of a compound having an amine or hydroxy group that reacts with the isocyanate.

The amine or hydroxy containing compound useful for capping the isocyanate is selected from the group consisting of mono or dialkyl amines, such as n-propyl amine, isopropyl amine, n-hexyl amine, 2-ethyl hexyl amine, n-decyl amine, stearyl amine; $C_4$–$C_{18}$ mono or dicycloalkyl amines, such as cyclopentyl amine, cyclohexyl amine, dicyclohexyl amine; heterocyclic $C_4$–$C_{18}$ amines, such as pyrrolidine, piperidine, and morpholine; aromatic $C_6$–$C_{18}$ amines, such as aniline, p-toluidine, o-toluidine, diphenyl amine, indole and indoline; araliphatic $C_7$–$C_{18}$ amines, such as benzyl amine, dibenzylamine and 2-phenyl ethylamine; $C_2$–$C_{36}$ mono and di alkanolamines, such as ethanol amine, diethanol amine, isopropanol amine, n-hexanol amine, n-undecanol amine. 3-aminopropanol, aminocyclohexanol, 2-(2-aminoethoxy) ethanol; $C_1$–$C_{36}$ ether alcohols, such as methoxyethanol, butoxyethanol, 1-butoxy-2-propanol, (butoxyethoxy) ethanol and solketal.

The amine or alcohol may be reacted in a stepwise reaction or simultaneously with the reactive functionality on the copolymer. The stepwise reaction is preferred. The reaction is usually carried out at temperatures of from about 50° C. to about 130° C. The reaction may be carried out in the presence of the same organic solvents which have been used in the polymerization reaction and in the presence of a catalyst such as organic tin compounds and/or tertiary amine.

The final copolymers have a weight average molecular weight of from about 3,000 to about 25,000, preferably from about 5,000 to about 12,000. The molar ratio of hydrogen functionality on the amino or hydroxy containing compound to the reactive functionality on the copolymer is from about 0.8 to about 1.3 and preferably from about 1.0 to 1.3.

The copolymer is combined with salt selected from the group consisting of the rare earth metal salts, transition metal salts and mixtures thereof, to form a pigment dispersant composition. The transition metal and rare earth metal salts include metal organic acid salts, halide salts, nitrates, and oxides of the early transition metals having atomic numbers of 21–28; 39–42; 57 and 72–74; and lanthanide series rare earth metals having atomic numbers of 58–71; and mixtures thereof. Preferably, the metal salt is selected from the group consisting of acetates of zirconium, manganese, cerium, yttrium, and lanthanum; nitrates of lanthanum, zirconium and cobalt; and chlorides of lanthanum and hafnium. Examples of these include manganese acetate, cerium acetate, yttrium acetate, lanthanum acetate, lanthanum nitrate, lanthanum chloride, hafnium dichloride oxide, zirconium dinitrate oxide, zirconium nitrate, zirconium acetoacetate, cobalt nitrate and mixtures thereof. The metal salt is present in an amount between 0.01% and 3.0% by weight, based on total dispersant composition weight.

The pigment dispersant composition may be used with inorganic pigments. Examples of these include metal oxides, chromates, phosphates, silicates and metallic flake pigments. Particular non-limiting examples of inorganic pigments that could be employed are titanium dioxide, barium sulfate, ocher, sienna, umber, hematite, limonite, red iron oxide, transparent red iron oxide, black iron oxide, brown iron oxide, chromium oxide green, zinc oxide, zinc sulfide, zinc chromate, strontium chromate, barium chromate, zinc phosphate, silicas such as fumed silica, talc, barytes, ultramarine and aluminum flake pigment.

The metal flake pigment that is particularly useful with the present invention is chromated aluminum flake pigment. Chromated aluminum is an aluminum flake particle surface treated with dichromate salts. Aluminum particles as contemplated for use with the invention generally have a surface area that may range from about 0.05 to about 15 $m^2/g$ of aluminum. The aluminum particles that are specifically contemplated as preferred aspects of the invention are chromated aluminum flakes, powders and granules. In a preferred aspect, the surface area of the aluminum is from about 2 to about 14.5 $m^2/g$. The average particle size of the aluminum flake pigment is preferably from 1 to 70 microns, more preferably from 5 to 50 microns.

Commercial chromated aluminum flake pigment pastes are available from companies such as Obron Atlantic Corp., Painesville, Ohio. For certain waterborne paint applications, such as automotive basecoats, non-leafing aluminum flake pigments, such as 8160 AR aluminum paste from Obron, have been utilized.

For the preparation of pigment paste, the pigments or dyestuffs are dispersed in a solution of the copolymer in water with the rare earth or transition metal salt or a mixture thereof. Optionally, cosolvent, wetting agents, surfactants plasticizers and other ingredients may be included. The paste is then ground in a ball mill or other mill. The pigment paste has a concentration of from about 10 to about 60% by weight of pigments based on the total weight of the pigment paste.

The pigment paste of the present invention is added to water dispersible film forming resin such as those described in Pat. Nos. 4,794,147; 4,791,168; 4,518,724; and 4,403,085. These patents also describe the principle resin. Preferred principle resins are described in U.S. Pat. Nos. 4,794,147 and 4,791,168.

The concentration of the pigment paste in the aqueous coating composition is from about 10 to about 45% by weight based on the total weight of the aqueous coating composition.

The addition of a metal salt to the dispersant composition of the present invention results in greatly improved dispersibility of inorganic pigments in pigment grinds. The metal salt allows for increased pigment concentrations in forming the pigment pastes and greatly lowers the viscosity of the pigment paste dispersion. The pigment pastes formed according to the present invention also require a very low level of organic solvents or cosolvents in comparison to pigment pastes used heretofore. The combination of increased pigment concentration and reduced organic cosolvents in the pigment paste allow for an unprecedented degree of latitude in formulating a coating composition, especially a coating composition having a lower content of volatile organic compounds. Additionally, an increased concentration of pigment in the pigment paste and reduced milling times improve manufacturing efficiency and reduce costs associated with the manufacture of the pigment paste dispersion.

Coating compositions of the present invention are formulated by mixing the pigment dispersions of the present invention, along with other components, into water dispersible basecoat compositions. Examples of the water dispersible basecoat compositions include, but are not limited to, water dispersible film forming resins such as a water dispersible non-ionic polyurethane resin of the type disclosed in U.S. Pat. No. 4,794,147, a water dispersible anionic polyurethane resin of the type disclosed in U.S. Pat. No. 4,791,168, or a water dispersible acrylic resin of the type disclosed in U.S. Pat. Nos. 4,403,085 and 4,518,724.

The resin is mixed with an aminoplast resin, polyisocyanate, or other suitable cross-linking agent, one or more rheology control agents if desired, water and a small amount of organic solvent if needed. Other agents may be included such as various fillers, surfactants, plasticizers, wetting agents, defoamers, adhesion promoters and catalysts in minor amounts. Other additives may be used, such as organic solvents, catalysts, conditioning agents, thickeners, rheology control agents, antioxidants, leveling agents and mixtures thereof.

The basecoat compositions containing the pigment dispersions of the present invention are applied to a metal or plastic substrate in one or more coats. The coating composition may be sprayed or electrostatically deposited onto metal or plastic substrates such as, for example, automotive vehicle bodies. Application may be made, for example, by an air atomizer (Binks Model 62 spray gun, available from the Binks manufacturing Corporation, Franklin Park, Ill.), or by using other conventional spray methods known in the art.

After being deposited, the basecoat compositions may be flash dried at a temperature sufficient to remove a portion of the solvent, but below that sufficient to cure the applied coating, typically temperatures within the range of from room temperature to about 145° F. (63° C.). After the first basecoat is deposited, a second basecoat and subsequent layer of basecoat, if needed or desired can be deposited over the first layer, either with or without flash drying. A clear, transparent top coat layer is then subsequently applied over the last basecoat layer. Any known unpigmented or transparently pigmented coating agent is, in principle, suitable for use as the topcoat material.

After the clear coat is applied over the basecoat layer(s), the multi-layer coating is then baked to cross-link and cure the polymeric materials and to drive the small amount of residual water and/or solvent from the coating layer(s). This baking step generally involves the heating of the coated substrate for periods of from about 10 to about 60 minutes and temperatures ranging between about 150° F. (66° C.) and about 300° F. (149° C.). The baking step cures the multi-layer coating to a hard, durable film.

The presence of the rare earth and/or transition metal salt in dispersions containing aluminum flake pigments has the effect of minimizing or eliminating corrosion of the chromated aluminum flake pigments, as evidenced by eliminating or greatly reducing hydrogen gassing in the coating composition.

An aluminum flake containing coating composition prepared according to the present invention applied to an enamel substrate was tested for gassing to determine corrosion resistance of the aluminum flake pigment in the basic pH environment of the coating. The results are set forth in Table 3.

The coating composition was tested for gassing in the gassing apparatus described above. A 250 ml sample of enamel containing aluminum flakes is filled into the gas washing bottle. The assembled apparatus containing the flakes is placed in a 40° C. bath and allowed to equilibrate for 60 minutes. After allowing for equilibration, the screw cap is tightened securely. The sample is tested in the 40° C. water bath at 24 hour intervals to measure the amount of hydrogen gas produced. The acceptable maximum level of generated hydrogen gas is 4 mils after 30 days.

In summary, the dispersant composition of the present invention containing the rare earth and/or transition metal salts provide pigment dispersions with higher pigment concentration and decreased viscosity. The presence of the rare earth metal salt, transition metal salt or mixture thereof in dispersions containing chromated aluminum flake pigments also minimizes or eliminates corrosion of the pigments, as evidenced by eliminating or greatly reducing hydrogen gassing in the coating composition. The resultant coatings of the present invention, particularly those containing the chromated aluminum flake pigment, are highly reflective and demonstrate excellent appearance.

Although certain embodiments of the invention have been selected for description in the examples, the examples are merely illustrative and do not in any way limit the scope of the invention as defined in the attached claims.

EXAMPLES

Example 1

Preparation of Isocyanate Functional Acrylic Copolymer 1

231.3 g (2.02 mol) of methyl amyl ketone was charged to a reaction vessel fitted with stirrer and condenser. The solvent was heated to reflux temperature and maintained at reflux for the duration of the reaction. A blend consisting of 94.8 g (0.91 mol) styrene, 160.7 g (1.13 mol) butyl methacrylate, 144.8 g (1.13 mol) butyl acrylate and 271.7 g (1.35 mol) 1-(1-isocyanato-1-methylethyl)-3-(1-methylethenyl) benzene, hereafter referred to as TMI®, available from American Cyanamid Co., Wayne, N.J. 07470, was slowly added over a period of three hours. 67.2 g of 50% active tert-butyl peracetate was added to the monomer blend to initiate the vinyl polymerization. 33.6 g of initiator along with 58.0 g of methyl amyl ketone were added one half hour after the addition of monomer was complete. The mixture was heated for an additional 1.5 hours and then cooled and collected for further modification.

Example 2

Preparation of Epoxy Functional Acrylic Copolymer 222.0 g (1.94 mol) of methyl amyl ketone was charged to a reaction vessel fitted with stirrer and condenser. The solvent was heated to reflux temperature and maintained at reflux for the duration of the reaction. A blend of 104.2 g (1.00 mol) styrene, 210.5 g (1.48 mol) butyl methacrylate, 131.0 g (1.02 mol) butyl acrylate, 72.1 g (0.50 mol) hydroxypropyl methacrylate and 142.2 g (1.00 mol) glycidyl methacrylate, was slowly added over a period of three hours. 66.0 g of 50% active tert-butyl peroxy acetate was added to the monomer blend to initiate the vinyl polymerization. 33.0 g of 50% active initiator along with 55.0 g methyl amyl ketone were added one half hour after the addition of monomer was complete. The mixture was heated for an additional 1.5 hours and then cooled and collected for further modification.

Example 3

Preparation of Anhydride Functional Acrylic Copolymer

A solvent blend of 110.0 g (0.96 mol) methyl amyl ketone and 20.0 g methyl propyl ketone was charged to a reaction vessel fitted with stirrer, water trap and condenser. The solvent blend was heated to reflux temperature and maintained at reflux for the duration of the reaction. A monomer blend of 65.4 g (0.63 mol) styrene, 111.6 g (0.78 mol) butyl methacrylate, and 100.6 g (0.78 mol) butyl acrylate, was slowly added over a period of three hours. 40.0 g of 50% active tert-butyl peroxy acetate was added to the monomer blend to initiate the vinyl polymerization. 122.4 g (0.94 mol) itaconic acid was added simultaneously with the monomer blend into the reaction vessel at 7.5 minute increment shots of solid itaconic acid, followed by washings of methyl amyl ketone (47.0 g total). 20.0 g of initiator and 30.0 g of methyl amyl ketone were added one half hour after the addition of monomer was complete. The mixture was heated for an additional 1.5 hours until 14–16 g of water were removed and then cooled and collected for further modification.

Example 4

Preparation of Isocyanate Functional Acrylic Copolymer 2

219.6 g (1.92 mol) methyl amyl ketone was charged to a reaction vessel fitted with stirrer and condenser. The solvent was heated to reflux temperature and maintained at reflux for the duration of the reaction. A blend consisting of 248.9 g (1.75 mol) butyl methacrylate, 224.3 g (1.75 mol) butyl acrylate, and 301.9 g (1.50 mol) TMI® was slowly added over a period of three hours. 77.5 g of 50% active tert-butyl peroxy acetate was added to the monomer blend to initiate the vinyl polymerization. 38.8 g of initiator and 58.4 g of methyl amyl ketone were added one half hour after the addition of monomer was complete. The mixture was heated for an additional 1.5 hours and then cooled and collected for further modification.

Example 5

Copolymer Modified With Hydroxyethyl Ethylene Urea (HEEU)-Grind Resin 112.0 g (0.56 mol, average molecular weight of 2000) methoxy polyethylene glycol, 16.5 g (0.13 mol) hydroxyethyl ethylene urea, 4.0 g of a 1% solution of dibutyltin dilaurate in methyl propyl ketone, and 300.0 g isocyanate-functional acrylic prepared in accordance with Example 1 were charged to a reaction vessel fitted with a stirrer and condenser. The mixture was heated to 120° C. and maintained at that temperature for not more than two hours. At the end of this time, the mixture was titrated and the result indicated that all of the methoxy polyethylene glycol and hydroxyethyl ethylene urea had reacted with the isocyanate groups. The remainder of the isocyanate functionality was capped with 7.5 g (0.12 mol) monoethanolamine which was added over a period of 5–10 minutes while the mixture was stirred and the temperature was approximately 90° C. The temperature then rose to 100° C. and then subsided. When the exothermic reaction had ceased, the mixture was titrated. Titration revealed no remaining isocyanate functionality. The material was subsequently dispersed with 10.0 g (0.55 mol) of deionized water.

Example 6

Copolymer Modified With Phosphate Ester-Grind Resin 96 g (0.47 mol, average molecular weight of 2000) methoxy polyethylene glycol, 3.7 g of a 1% solution of dibutyltin dilaurate in methyl propyl ketone, and 300.0 g isocyanate-functional acrylic prepared in accordance with Example 1 were charged to a reaction vessel fitted with a stirrer and condenser. The mixture was heated to reflux and maintained at reflux for not more than one hour. At the end of this time, the mixture was titrated and the result indicated that all of the methoxy polyethylene glycol had reacted with the isocyanate groups.

After the mixture had cooled to approximately 60° C., 17.9 g (0.29 mol) ethanolamine was added. The temperature then rose to 90° C. and then subsided. The mixture was titrated and the result indicated no remaining isocyanate functionality.

Next, polyphosphoric acid 19.9 g, (0.08 mol.) was added along with 100 g toluene. The mixture was heated to reflux 25° C., for approximately three hours.

Example 7

Titanium Dioxide Pigment Paste With Phosphate Modified Copolymer and Cerium Triacetate To a stirred mixture of phosphate modified copolymer 73.8 g, prepared by Ex. 6, propylene glycol monomethyl ether 80 g, and N-methylpyrrolidone 10 g was added deionized water 1123 g, and the resultant mixture was stirred for approximately ten minutes. Next, titanium dioxide[1] 1200 g, was added slowly, over 1–2 minutes, to the above solution and stirred with a Cowles blade for approximately 15 minutes. Cerium triacetate 9.6 g was then added to the above mixture, whereupon a noticeable drop in viscosity occurred within seconds of the addition of the cerium salt. The resultant mixture was then ground on a gravity sand mill until the largest pigment particle observable was less than 4 microns.

[1] Titanium dioxide sold under trademark Tipure, from DuPont de Nemours, E. I. Co., Wilmington, Del.

Example 7A

Titanium Dioxide Pigment Paste With Phosphate Modified Copolymer (Control)

A titanium dioxide pigment paste was prepared according to Example 7, without the Cerium triacetate.

Example 8

Iron Oxide Pigment Paste

To a stirred mixture of 19.7 grams phosphate modified copolymer, prepared by Ex. 6, 3.0 grams propylene glycol mono methyl ether and 3.0 grams N-methylpyrrolidone was added 242.0 grams deionized water with stirring (via Cowles blade), and stirred for 5–15 minutes. Iron oxide pigment[1], 154 g, was added slowly, over 1–2 minutes, to the above solution and stirred with a Cowles blade for approximately 15 minutes. 1.1 gram Cerium triacetate was then added to the above mixture, whereupon a noticeable drop in viscosity occurred within seconds of addition of the cerium salt.

The resultant mixture (pre-mix) was then ground on a miniature attritor using steel shot media until the largest pigment particle size observable was less than 4 microns. The ground paste was then filtered to remove the steel shot media affording the pigment paste.

It should be noted that the viscosity reduction caused by the cerium salt is independent of the addition order of the cerium salt. For example, the viscosity reduction occurred when the cerium salt was added to the pre-mix, during the grinding or milling process, or after the milling process. In all cases viscosity reduction occurs.

[1] Iron oxide used was Ferric oxide from BASF Corp.

Example 8A

Iron Oxide Pigment Paste 2 (Control)

A pigment paste was prepared as described in Example 8, without the Cerium triacetate.

Example 9

Titanium Dioxide Pigment Paste with HEEU Modified Copolymer and Cerium Triacetate To a stirred mixture of 62.0 grams dispersant containing HEEU prepared according to Ex.5, 45.0 grams propylene glycol mono methyl ether and 45.0 grams propylene glycol mono butyl ether was added 1123.0 grams deionized water, with stirring (via Cowles blade), and stirred for 5–15 minutes. The titanium dioxide pigment[1], 1200.0 grams, was added slowly, over 1–2 minutes, to the above solution and stirred with a Cowles blade for approximately 15 minutes. 0.12 gram Cerium triacetate was then added to the above mixture, whereupon a noticeable drop in viscosity occurred within seconds of addition of the cerium salt. The resulting paste was ground in a sand mill for three passes.

[1] Titanium dioxide pigment sold under trademark Tipure, from DuPont de Nemours, E. I. Co., Wilmington, Del.

Example 9A

Titanium Dioxide Pigment Paste (Control)

A titanium dioxide containing pigment paste was prepared according to example 9, but without the addition of Cerium triacetate.

Example 10

Fumed Silica Paste

A fumed silica paste was prepared by mixing together 12.16 parts by weight Aerosil® R-972 fumed silica (Degussa Corporation, 2 Penn Plaza New York, N.Y.), 31.36 parts by weight isopropanol, 17.10 parts by weight monobutyl ethylene glycol ether, and 5.90 parts by weight Resimene®, 747 methylated melamine formaldehyde resin, available from Monsanto Corp. 800 N. Lindbergh Blvd., St. Louis Mo. 63167. The resultant mixture was stirred on cowles for approximately thirty minutes after which 33.48 parts by weight nonionic polyurethane grind resin was added. The mixture was then run through a sand mill for two passes.

The nonionic polyurethane resin was prepared according to the teachings of U.S. Pat. No. 4,794,147, the contents of which are incorporated herein by reference.

Example 11

Carbon Black Tint

The carbon black tint was prepared by mixing together 5.51 parts deionized water and 10.49 parts black pigment Monarch 900, available from Cabot Corp. Billerica, Mass. 01821. This mixture was added to 84.00 parts nonionic polyurethane resin with rapid stirring.

The resultant mixture (pre-mix) was then ground on an attritor using steel shot media until the largest pigment particle size observable was less than 4 microns. The ground paste was then filtered to remove the steel shot media affording the pigment paste.

The nonionic polyurethane resin was prepared according to the teachings of U.S. Pat. No. 4,794,147, the contents of which are incorporated herein by reference.

Coating Composition I
With Cerium Acetate Treated Titanium Dioxide

| Ingredient | Parts by weight |
| --- | --- |
| 1. Pluricol P-1010[1] and 3% Laponite[2] dispersion in water | 13.61 |
| 2. Resimene ® 747 methylated melamine[3] | 6.87 |
| 3. Ethylene glycol monobutyl ether | 1.72 |
| 4. Nonionic polyurethane resin dispersion[4] | 27.87 |
| 5. Fumed Silica dispersion (Example 10) | 7.97 |
| 6. Titanium dioxide (white) pigment paste (Example 9) | 39.67 |
| 7. Carbon black tint (Example 11) | 0.12 |
| 8. Nacure ® 2500 blocked acid catalyst[5] | 1.88 |
| 9. Tinuvin 1130[6] | 0.29 |

[1] Surfactant from BASF Corporation, Wyandotte, MI 48192.
[2] Synthetic bentonite clay from Laporte, Incorporated, Saddle Brook, NJ 07662.
[3] Melamine crosslinker from Monsanto Corporation, St. Louis, MO 63167.
[4] The nonionic polyurethane resin was prepared in accordance with the teachings of U.S. Pat. No. 4,794,147.
[5] Blocked acid catalyst from King Industries, Norwalk, CT 06852.
[6] UV absorber from Ciba-Geigy Corp. Additives Division, Hawthorne, NY 10532.

Components 2 and 3 were premixed, then added to component 1 with rapid stirring. To this mixture were then added, successively with rapid stirring, components 4–9. After mixing of all components, stirring was continued for about one hour, after which the coating was filtered into a container and capped for later use.

Coating Composition II
With Cerium Triacetate Treated Cromated Aluminum Flake Pigment and HEEU Polar Functional Compound A slurry was prepared from the following ingredients.

| | |
| --- | --- |
| 1. Cymel ® 327[1] | 20.6 g |
| 2. 2-ethyl hexanol | 17.0 g |
| 3. Dispersant resin containing 2-hydroxyethyl ethylene urea (HEEU) based dispersant grind resin (Ex. 5) | 13.2 g |
| 4. Cerium triacetate | 0.2 g |
| 5. Chromated aluminum flake pigment[2] | 29.2 g |
| 6. Deionized water | 10.0 g |

First a mixture of the Cymel® 327 and 2-ethyl hexanol was prepared. Next the HEEU based dispersant grind resin was added to the mixture. In a separate vessel the cerium triacetate and water were combined with mixing and then added to the first mixture. The aluminum pigment was then added. The mixture was then agitated for 15 minutes.

Next the following ingredients were added as described below.

| | |
| --- | --- |
| Emulsion resin[3] | 181.5 g |
| Dimethylethanolamine 5% (DMEA) | 10.6 g |
| Viscalex ® HV-30[4] | 6.7 g |
| Deionized water | 74.4 g |
| Propylene glycol propyl ether | 72.0 g |

First the resin and 5% DMEA were combined to provide a resin with a pH of 8. In a separate container the Viscalex® and water were combined and then added slowly to the resin. Next, the propyl ether was added to the mixture. Finally, the aluminum slurry was added to the mixture, with mixing for 5–10 minutes. The coating was then neutralized to a pH of 8 with additional 19.3 g of 5% DMEA. After 2 days the paint was reduced to spray viscosity with the addition of 138.1 g deionized water to achieve a viscosity of 96.8 cP on a Bohlin V-88 viscometer.

[1] A methylated melamine formaldehyde resin, sold under the trademark Cymel® and available from American Cyanamid Co.
[2] Chromated aluminum pigment from Obron Atlantic Corp., Painesville, Ohio.
[3] Acrylic uncrosslinked core-shell polymeric emulsion resin having 45% non-volatile content.
[4] Rheology control agent sold under the trademark Viscalex® and available from Allied Colloids Inc., Suffolk, Va.

Coating Composition IIa
A coating composition was prepared as in Coating II, except that the final pH was adjusted to 8.5 instead of 8.0.

Coating Composition IIb
A coating composition was prepared as in Coating II, except that propylene glycol propyl ether was substituted for the 2-ethyl hexanol in the slurry formulation.

Coating Composition III
With Cerium Triacetate Treated Chromated Aluminum and Phosphate Polar Functional Compound A slurry was prepared from the following ingredients.

| | |
| --- | --- |
| 1. Cymel ® 327[1] | 25.80 g |
| 2. 2-ethyl hexanol | 21.30 g |
| 3. Phosphate Ester based dispersant Grind Resin (Ex. 6) | 19.30 g |
| 4. Cerium triacetate | 0.25 g |
| 5. Chromated aluminum flake pigment[2] | 36.50 g |
| 6. Deionized water | 15.00 g |

First a mixture of the Cymel® 327 and 2-ethyl hexanol was prepared. Next the phosphate ester compound was added to the mixture. In a separate vessel the cerium triacetate and water were combined with mixing and then added to the first mixture. The aluminum pigment was then added. The mixture was agitated for 15 minutes.

Next the following ingredients were added as described below.

| | |
| --- | --- |
| Emulsion resin[3] | 226.4 g |
| Dimethylethanolamine 5% (DMEA) | 13.4 g |
| Viscalex ® HV-30[4] | 8.4 g |
| Deionized water | 92.5 g |
| Propylene glycol propyl ether | 90.0 g |

First the resin and 5% DMEA were combined to provide a resin with a pH of 8. In a separate container the Viscalex® and water were combined and then added slowly to the resin. Next, the propyl ether was added to the mixture. Finally, the aluminum slurry was added to the mixture, with mixing for 5–10 minutes. The coating was then neutralized to a pH of 8 with an additional 37.2 g of 5% DMEA. After 2 days the paint was reduced to spray viscosity with the addition of 188.1 g deionized water to achieve a viscosity of 85.3 cP on a Bohlin V-88 viscometer.

[1] A methylated melamine formaldehyde resin, sold under the trademark Cymel® and available from American Cyanamid Co.
[2] Chromated aluminum pigment from Obron Atlantic Corp., Painesville, Ohio.
[3] Acrylic uncrosslinked core-shell polymeric emulsion resin having 45% non-volatile content.
[4] Rheology control agent sold under the trademark Viscalex® and available from American Colliods Inc., Suffolk, Va.

TABLE 1

COMPARATIVE SAMPLES OF PIGMENT DISPERSANT COMPOSITIONS
Pigment dispersant compositions were prepared according to the methods set forth in
examples 7–9 and having the parameters as set forth in Table 1 for polar functional
compound and % metal salt. The pigment to binder ratios, % non-volatile content and %
pigment are set forth in Table 1 for comparison of compositions with and without metal salts.

| EX | PIGMENT | POLAR FUNCTIONAL COMPOUND | % METAL SALT* | PIGMENT TO BINDER RATIO | % NON-VOLATILE CONTENT* | % PIGMENT* |
|---|---|---|---|---|---|---|
| A | Titanium Dioxide | phosphate | 1.3% Cerium Triacetate | 45 | 61.4 | 58.5 |
| B | Titanium Dioxide | phosphate | — | 25 | 50.18 | 48.25 |
| C | Iron Oxide | phosphate | .26% Cerium Triacetate | 15 | 39.7 | 36.4 |
| D | Iron Oxide | — | — | 8 | 32.6 | 30.1 |
| E | Titanium Dioxide | HEEU[a] | 1.3% Cerium Triacetate | 35 | 61.5 | 58.66 |
| F | Titanium Dioxide | HEEU[a] | — | 15.75 | 46.9 | 44.1 |

*All percentages are based on total dispersant composition weight.
[a]Dispersant with HEEU is hydroxy ethyl ethylene urea.

As can be seen from Table 1, pigment to binder ratio increased, the percentage of pigment in the dispersant composition increased and the nonvolatile content of the dispersant composition increased with the introduction of the metal salt to the dispersant composition.

TABLE 2

COMPARISON OF EFFECT ON VISCOSITY OF DISPERSANT COMPOSITIONS
WITH AND WITHOUT TRANSITION METAL OR RARE EARTH METAL SALTS
Pigment dispersions containing titanium dioxide and phosphate dispersant were prepared following the method of Example 7. A dispersant composition containing cerium acetate, labelled Ex. A, and a control without cerium acetate, labeled Ex. B, were compared to determine the effect of the metal salt on viscosity. The results are set forth in the following table.

| EX | PIGMENT | METAL SALT | PIGMENT TO BINDER RATIO | PERCENT PIGMENT | % NON-VOLATILE CONTENT | VISCOSITY[a] |
|---|---|---|---|---|---|---|
| A | Titanium Dioxide | 0.38 | 25 | 43.1 | 50.4 | 45 KU @ 23° C. |
| B | Titanium Dioxide | — | 25 | 48.1 | 50.18 | 59 KU @ 23° C. |

[a]Viscosity was measured with a Stormer viscometer, Ser. No. 86031, manufactured by Thomas Scientific.

As can be seen from Table 2, the addition of the cerium acetate metal salt lowers the viscosity of the dispersant composition.

TABLE 3

GASSING RESULTS FOR CHROMATED ALUMINUM FLAKE CONTAINING
COATINGS TREATED WITH DISPERSANT COMPOSITION
Gassing results for coating compositions containing chromated aluminum flake pigment in combination with the dispersant compositions containing transition metal or rare earth metal salts are set forth in the following table.

| COATING | POLAR CPD | SOLVENT FOR SLURRY | FINAL pH | GASSING RESULTS IN ML 14 DAYS | 21 DAYS | 30 DAYS |
|---|---|---|---|---|---|---|
| II | HEEU[a] | EH[c] | 8.0 | 0 | 0 | 0 |
| IIa | HEEU[a] | EH[c] | 8.5 | 2 | 3 | 3 |

TABLE 3-continued

GASSING RESULTS FOR CHROMATED ALUMINUM FLAKE CONTAINING
COATINGS TREATED WITH DISPERSANT COMPOSITION

Gassing results for coating compositions containing chromated aluminum flake pigment in combination with the dispersant compositions containing transition metal or rare earth metal salts are set forth in the following table.

| COATING | POLAR CPD | SOLVENT FOR SLURRY | FINAL pH | GASSING RESULTS IN ML | | |
|---|---|---|---|---|---|---|
| | | | | 14 DAYS | 21 DAYS | 30 DAYS |
| IIb | HEEU[a] | PG[d] | 8.0 | 2 | 2 | 2 |
| III | PHOSPHATE[b] | EH[c] | 8.0 | 2 | 2 | 2 |

[a]Heeu is hydroxy ethyl ethylene urea compound of Ex.
[b]Phosphate is the phosphate ester compound of Ex. 6.
[c]EH is ethyl hexanol
[d]PG is propylene glycol

We claim:

1. A pigment dispersion comprising inorganic pigment and a polymeric pigment dispersent comprising the reaction product of
    (i) an ethylenically unsaturated monomer having a reactive functionality which is selected from the group consisting of isocyanates, anhydrides, and epoxy functionalities,
    (ii) at least one ethylenically unsaturated monomer having no reactive functionality to react with the reactive functionality of monomer (i),
    (iii) a polyalkylene glycol compound selected from the group consisting of polyalkylene glycol monoalkyl ethers and mixtures thereof, and
    (iv) a compound having polar functionality selected from the group consisting of silane-containing compounds having hydroxyl, amino, mercapto, isocyanato or oxirane functional groups; phosphorus containing compounds having hydroxyl, amino, or mercapto functionalities; and urea-containing compounds having the formula

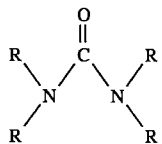

wherein each R is independently selected from the group consisting of H, alkyl, alkylene, and R'OH where R' is an alkylene group having from 1 to 4 carbon atoms, and the reaction product of (i)–(iv) is reacted with a metal salt selected from the group consisting of transition metal and rare earth metal salts, wherein the metal salt is present to enhance pigment concentration in the dispersion, in an amount between 0.01 and 3.0 percent based on total weight of the polymeric pigment dispersent and metal salt.

2. The pigment dispersion of claim 1, wherein the transition metal and rare earth metal salt is selected from the group consisting of metal organic acid salts, halide salts, nitrates, oxides of the transition metals and rare earth metals and mixtures thereof.

3. The pigment dispersion of claim 1, wherein the transition metal and rare earth metal salt is selected from the group consisting of acetates of zirconium, manganese, cerium, yttrium, and lanthanum; nitrates of lanthanum, zirconium and cobalt; and chlorides of lanthanum and hafnium.

4. The pigment dispersion of claim 1, wherein the transition metal and rare earth metal salt is selected from the group consisting of manganese acetate, cerium acetate, yttrium acetate, lanthanum acetate, lanthanum nitrate, lanthanum chloride, hafnium dichloride oxide, zirconium dinitrate oxide, zirconium nitrate, zirconium acetoacetate, iron chloride, cobalt nitrate, and mixtures thereof.

5. The pigment dispersion of claim 1, wherein the ethylenically unsaturated monomer having a reactive functionality (i) is selected from the group consisting of 1-(1-isocyanato-1-methylethyl)-3-(1-methylethenyl)benzene, isocyanato ethylacrylate, isocyanato ethyl methacrylate, itaconic anhydride, maleic anhydride, and glycidyl methacrylate.

6. The pigment dispersion of claim 1, wherein the ethylenically unsaturated monomer (ii) is selected from the group consisting of acrylic and methacrylic alkyl, aryl, aryl alkyl, alkoxyalkyl and aryloxyalkyl esters derived from alcohols having from 1 to 20 carbon atoms and mixtures thereof.

7. The dispersant composition of claim 1, wherein the ethylenically unsaturated monomer (ii) is selected from the group consisting of methyl, ethyl, propyl, n-butyl, isobutyl, tert-butyl, cyclohexyl, 2-ethylhexyl, acrylates and methacrylates.

8. The dispersant composition of claim 1, wherein the compound having polar functionality is present in an amount between 1.0 and 7.0 percent by weight based on total non-volatile content of the dispersant composition.

9. The dispersant composition of claim 1, wherein the urea-containing compound includes R having a functionality reactive with monomer (i), includes an R functionality selected from the group consisting of R'OH and R'NH$_2$ where R' has a carbon chain length of from 1 to 8 carbon atoms.

10. The dispersant composition of claim 1, wherein the pigment dispersent includes unreacted isocyanate and the pigment dispersent further comprises a compound for capping any unreacted isocyanate functionality remaining after the polymerization reaction of monomers (i) and (ii), wherein said compound is selected from the group consisting of mono amines, dialkyl amines, monocycloalkyl amines, dicycloalkyl amines, heterocyclic amines, aromatic amines, araliphatic amines, monoalkanolamines, di- alkanolamines and ether alcohols.

11. The dispersent composition of claim 1 wherein the pigment is a chromated aluminum flake pigment.

12. The dispersant composition of claim 1, wherein the urea containing compound is 2-hydroxyethylethylene urea, having the formula

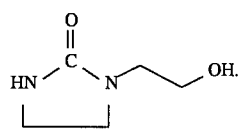

13. The dispersant composition of claim 1, wherein the polymeric pigment dispersion is polymerized from
   (i) ethylenically unsaturated monomer having a reactive functionality, selected from the group consisting of 1-(1-isocyanato-1-methylethyl)-3-(1-methylethenyl)benzene, isocyanato ethylacrylate, isocyanato ethyl methacrylate, itaconic anhydride, maleic anhydride, glycidyl methacrylate, and mixtures thereof, and
   (ii) at least one ethylenically unsaturated monomer selected from the group consisting of acrylic and methacrylic alkyl, aryl, aryl alkyl, alkoxyalkyl, aryloxyalkyl esters, and mixtures thereof.

14. The dispersant composition of claim 13, further comprising ethylenically functional aromatic compound (v), selected from the group of styrene, alpha-methyl styrene, tert-butyl styrene, para-hydroxy styrene, vinyl toluene, naphthyl acrylate, phenyl ethyl acrylate, phenyl methacrylate, naphthyl methacrylate, 3-phenylpropyl methacrylate, phenoxyethyl methacrylate, halogenated vinyl benzenes and mixtures thereof.

15. The pigment dispersion of claim 1, further comprising water.

16. The dispersant composition of claim 15, wherein the polymeric pigment dispersion is the reaction product of monomers (i) and (ii) and further comprises (v) an ethylenically-unsaturated aromatic monomer.

17. The dispersant composition of claim 16, wherein the ethylenically functional aromatic compound (v) is selected from the group consisting of styrene, alpha-methyl styrene, tert-butyl styrene, para-hydroxy styrene, vinyl toluene, naphthyl acrylate, phenyl ethyl acrylate, phenyl methacrylate, naphthyl methacrylate, 3-phenylpropyl methacrylate, phenoxyethyl methacrylate, halogenated vinyl benzenes and mixtures thereof.

* * * * *